United States Patent [19]

Kennard

[11] Patent Number: 4,573,366
[45] Date of Patent: Mar. 4, 1986

[54] POWER TRANSMISSION

[75] Inventor: Reed H. Kennard, Bixby, Okla.

[73] Assignee: Vickers, Incorporated, Troy, Mich.

[21] Appl. No.: 582,921

[22] Filed: Feb. 23, 1984

[51] Int. Cl.$^4$ ............................................. F16H 37/00
[52] U.S. Cl. ..................... 74/15.8; 74/15.82;
74/15.86; 74/606 R; 192/67 R; 192/85 C
[58] Field of Search ................... 74/15.8, 15.82, 15.86,
74/421 R, 606 R; 192/20, 67 R, 85 C

[56] References Cited

U.S. PATENT DOCUMENTS

| 2,999,398 | 9/1961 | Christian | 74/421 R |
| 3,249,188 | 5/1966 | Maina | 192/67 R |
| 3,270,580 | 9/1966 | Wagner | 74/475 |
| 3,425,527 | 2/1969 | Wolf | 192/85 C |
| 3,540,297 | 11/1970 | Wagner et al. | 74/15.86 |
| 4,281,560 | 8/1981 | Herscouici | 74/421 R |
| 4,398,433 | 8/1983 | Sonns | 74/475 |

Primary Examiner—Albert J. Makay
Assistant Examiner—David W. Westphal
Attorney, Agent, or Firm—Barnes, Kisselle, Raisch, Choate, Whittemore & Hulbert

[57] ABSTRACT

A power take-off device comprising a housing having spaced walls, an input shaft rotatably mounted in a first set of aligned openings in the walls, and an output shaft rotatably mounted in a second set of aligned openings in the walls. A pair of gears is interposed between the walls and rotatably mounted on the input shaft. The housing having an opening through which said one gear extends for engagement with a power source. A third gear is fixed on the output shaft and meshes with the teeth on the other gear. The first and second gears have annular gear portions and an annular clutch member having teeth engage a gear portion of one of the first and second gears to a position wherein said internal teeth engage the gear portions of both first and second gears.

34 Claims, 22 Drawing Figures

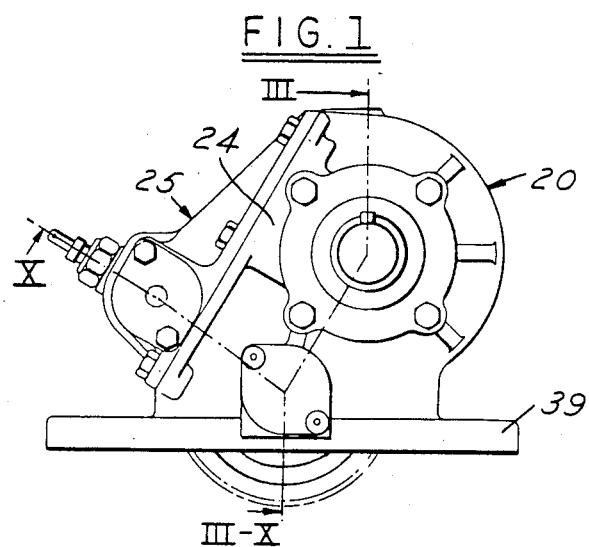
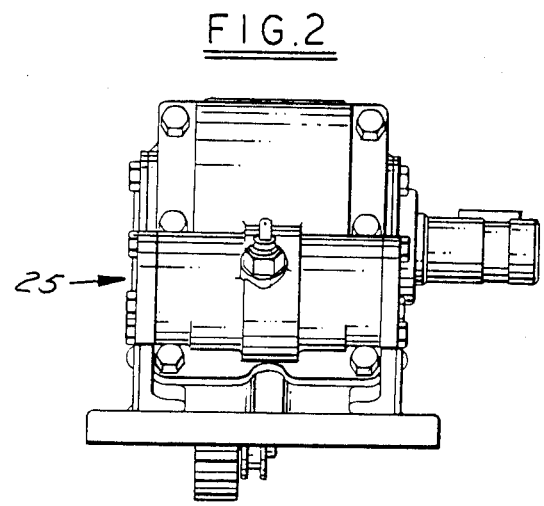
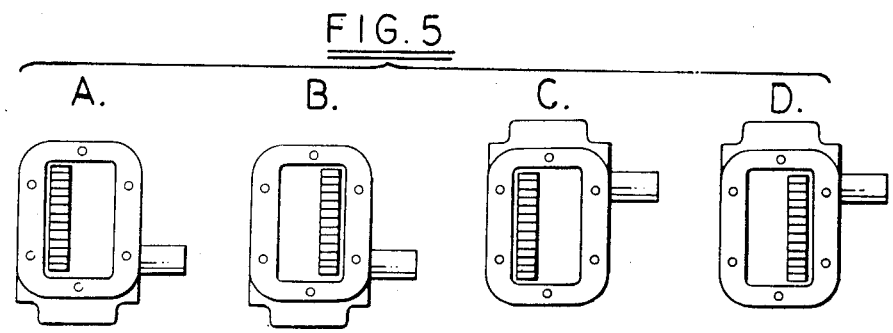

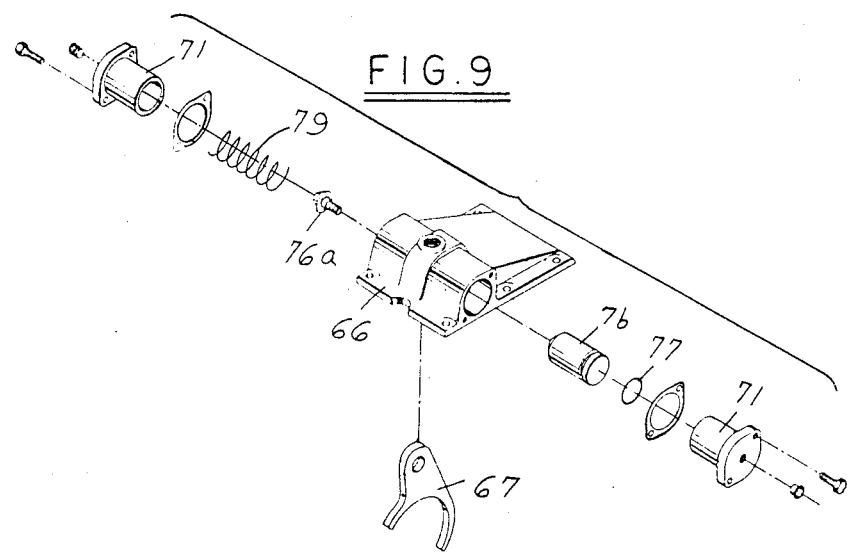
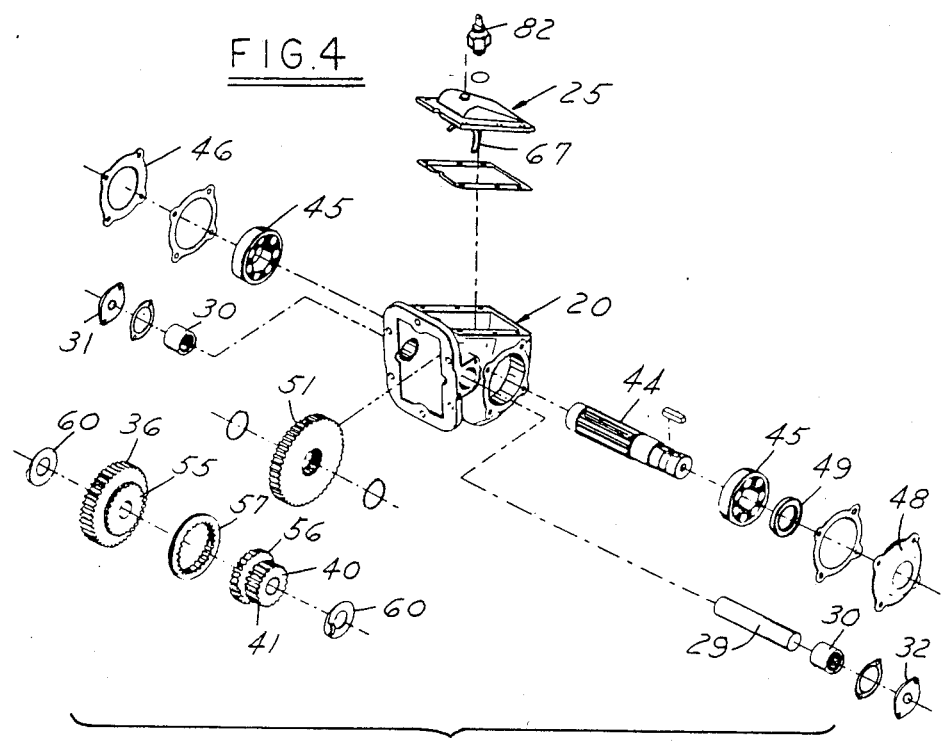

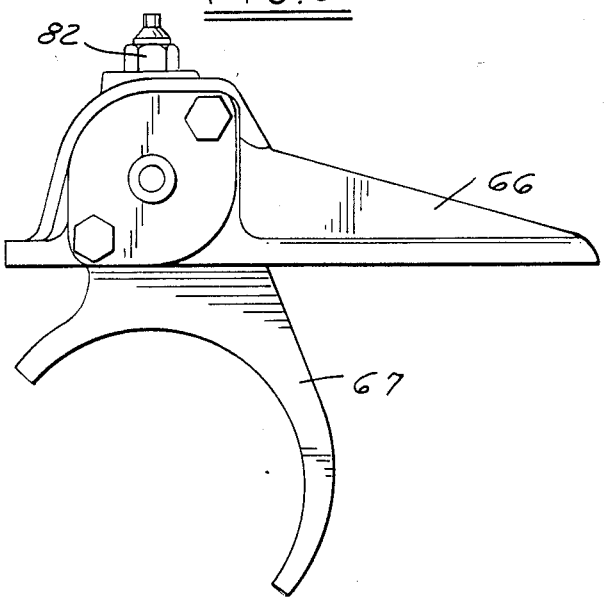
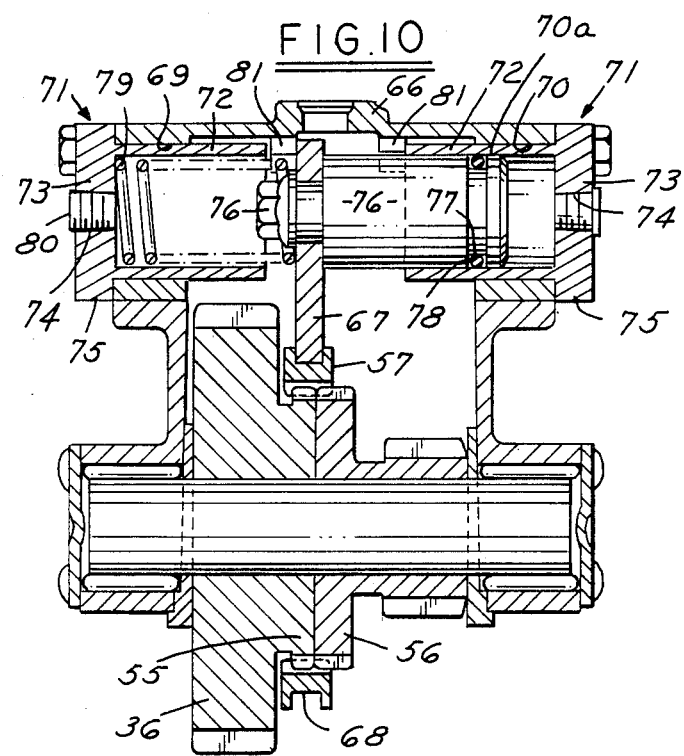

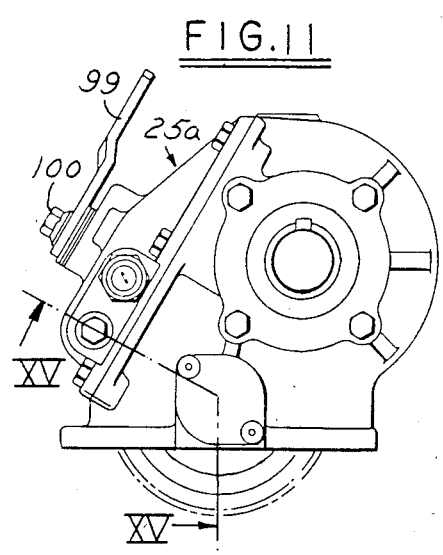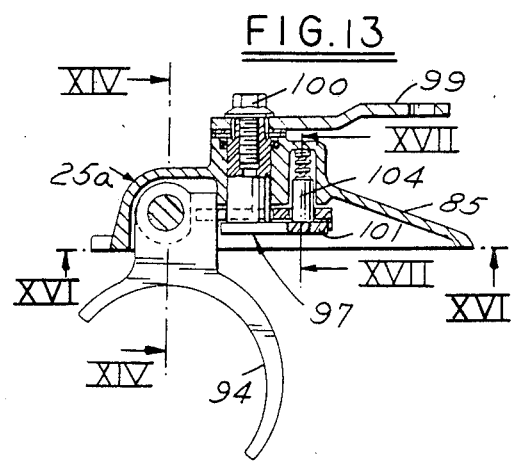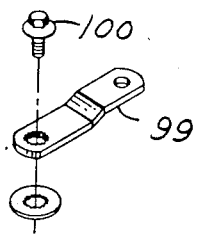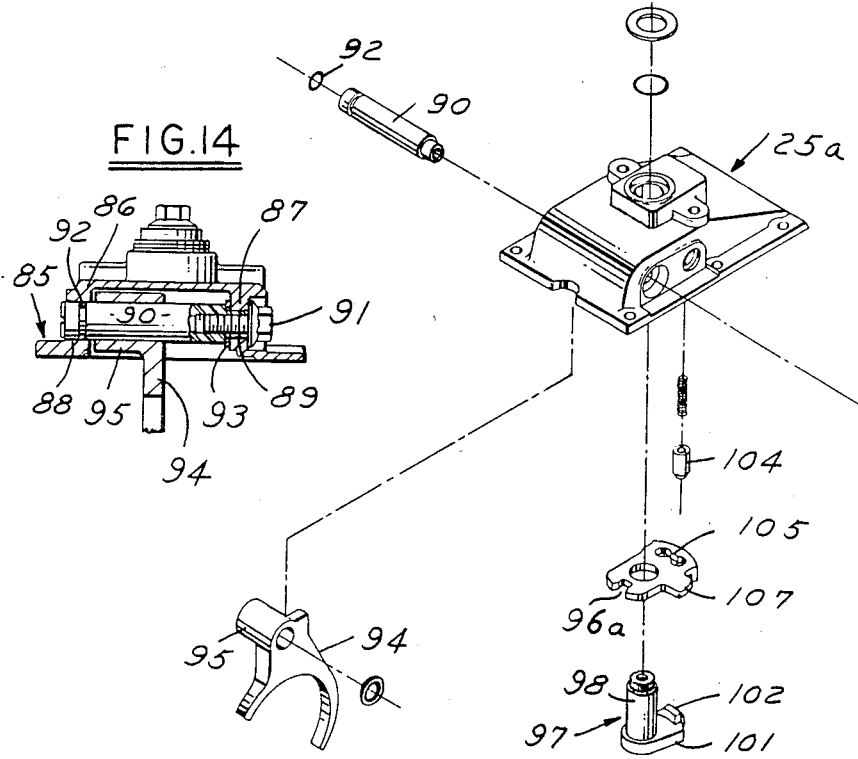

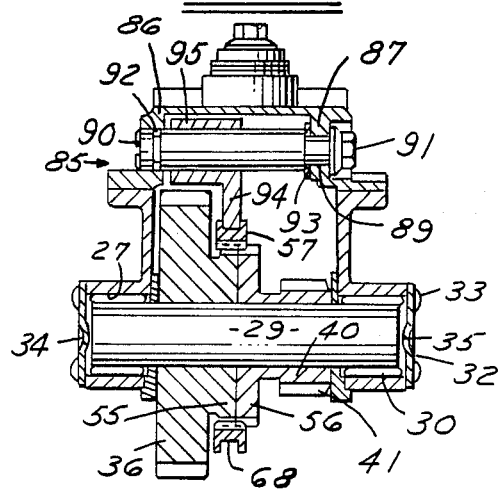
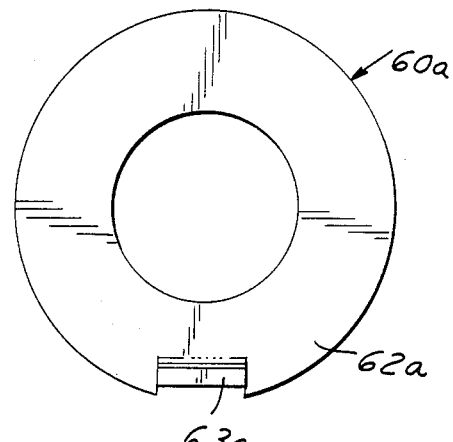
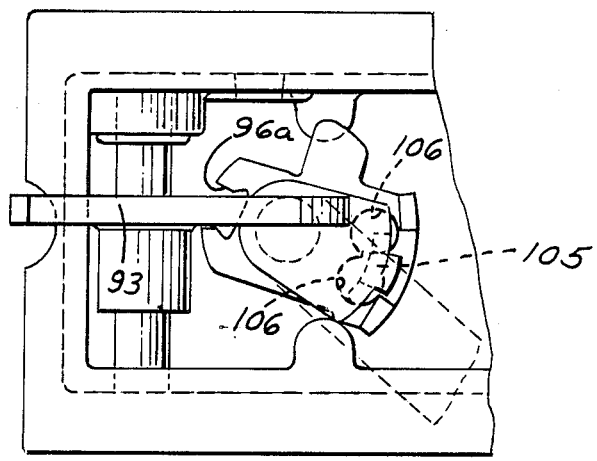
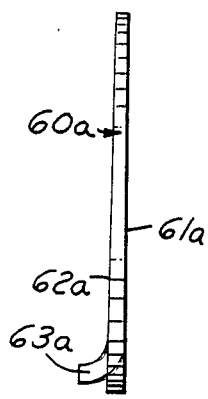
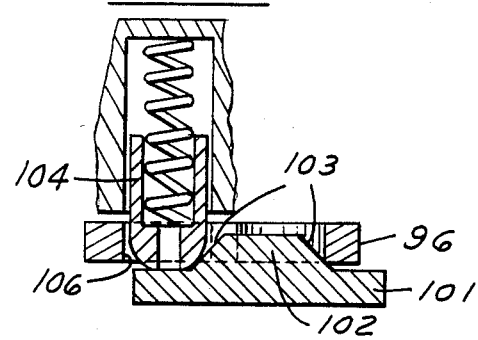

POWER TRANSMISSION

This invention relates to power take-off devices.

BACKGROUND AND SUMMARY OF THE INVENTION

In vehicles such as trucks and other off the road vehicles, it is common to utilize the power from the transmission to operate various components such as hydraulic pumps and mechanical devices.

Such mechanisms are known as power take-off devices and generally comprise a housing in which gears are supported. The housing is mounted on the transmission at an opening generally provided by the transmission manufacturer and one of the power take-off gears projects through the opening into engagement with the gear of the transmission to receive the input from the transmission. The power take-off device also includes an output shaft through which the output is provided and intermediate gears connecting the one gear and the output shaft. The device also includes means for engaging the gears to engage the power take-off. A typical shifting device is shown in U.S. Pat. No. 3,270,580.

Because of space limitations in the vehicle, it is desirable to provide compact power take-off devices that have a small envelope.

In one commonly used design, the power take-off includes a cast iron housing with a fixed shaft on which an input gear is rotatably mounted by bearings. A second gear also mounted on bearings is axially movable on the fixed shaft for engagement with a third gear on an output shaft. In order to provide a range of horse power capacities and torque, it has been heretofore necessary to design each power take-off for a particular use. In order to repair or attempt to change the gear ratios, it has been necessary to remove the fixed input shaft, replace the bearings and the gears.

Because the gears are mounted on bearings between the gears and the shafts, there is a limit to the minimum radius of the gears that can be changed and accordingly there is a limit to the range of horse power or torque that can be accommodated within the same housing.

Among the objects of the invention are to provide a power take-off which is compact, wherein a single housing can be utilized with various combinations of gears to provide a wide range of horse power capacities and torque; which is light in weight; which provides greater sound diffusion; which has higher impact strength; which incorporates novel shifting mechanisms of either the air or the mechanical type; wherein the speed ratio and transmission gear sets can be readily changed; which has improved bearing and gear design; which is more quiet in operation and wherein the various parts of the power take-off are accessible readily for repair; and which requires a minimum size or envelope of the housing.

In accordance with the invention the power take-off comprises a housing having spaced walls, an input shaft that is rotatably mounted in a first set of aligned openings in the walls and an output shaft rotatably mounted in a second set of aligned openings in the walls. A pair of gears is interposed between the walls and rotatably mounted on the input shaft. The housing has an opening through which said one of the pair of gears extends for engagement with a gear of a transmission. A third gear is fixed on said output shaft and meshes with the teeth on the other gear. The first and second gears have annular gear portions. An annular clutch member having internal teeth is movable from a position wherein the internal teeth engages a gear portion of one of the first and second gears to a position wherein the internal teeth engage the second gear portions on both the first and second gears.

The opening in the housing is sufficiently large to permit removal of the first and second gears by first removing the input shaft axially so that the first and second gears are thereby released.

The housing is preferably die cast and the walls of said housing have tapered surfaces extending inwardly toward one another. A first washer is interposed between the first gear and one of the walls and a second washer is interposed between the second gear and the other of the walls. The washers have openings through which the input shaft extends and each washer has spaced wall surfaces which taper such that the washers provide parallel surfaces for engagement with the first and second gears, respectively, thus eliminating a machining operation.

The take-off device also incorporates novel interchangeable shifter mechanisms for engaging and moving the clutch. In one form the shifter mechanism is air operated and in another form the shifter mechanism is mechanical for operation by cables or other linkages.

DESCRIPTION OF THE DRAWINGS

FIG. 1 is a side elevational view of a power take-off device embodying the invention.

FIG. 2 is a front elevational view.

FIG. 4 is an exploded view of the power take-off device.

FIGS. 5A, 5B, 5C and 5D are schematic views of the varying gearing arrangements.

FIG. 8 is a side elevational view of a shifter mechanism utilized in the power take-off device.

FIG. 9 is an exploded view of the shifter mechanism shown in FIG. 8.

FIG. 10 is a sectional view taken along the line X—X in FIG. 1 showing the shifter mechanism.

FIG. 11 is a side elevational view of a power take-off device showing a modified shifter mechanism.

FIG. 12 is an exploded view of the shifter mechanism shown in FIG. 11.

FIG. 13 is a sectional view of the modified shifter mechanism.

FIG. 14 is a sectional view taken along the line XIV—XIV in FIG. 13.

FIG. 15 is a sectional view taken along the line XV—XV in FIG. 11.

FIG. 16 is a bottom view taken along the line XVI—XVI in FIG. 13.

FIG. 17 is a fragmentary sectional view taken along the line XVII—XVII in FIG. 13.

FIG. 18 is a plan view of a modified form of thrust washer.

FIG. 19 is a side elevational view of the washer shown in FIG. 18.

DESCRIPTION

Figure 3:
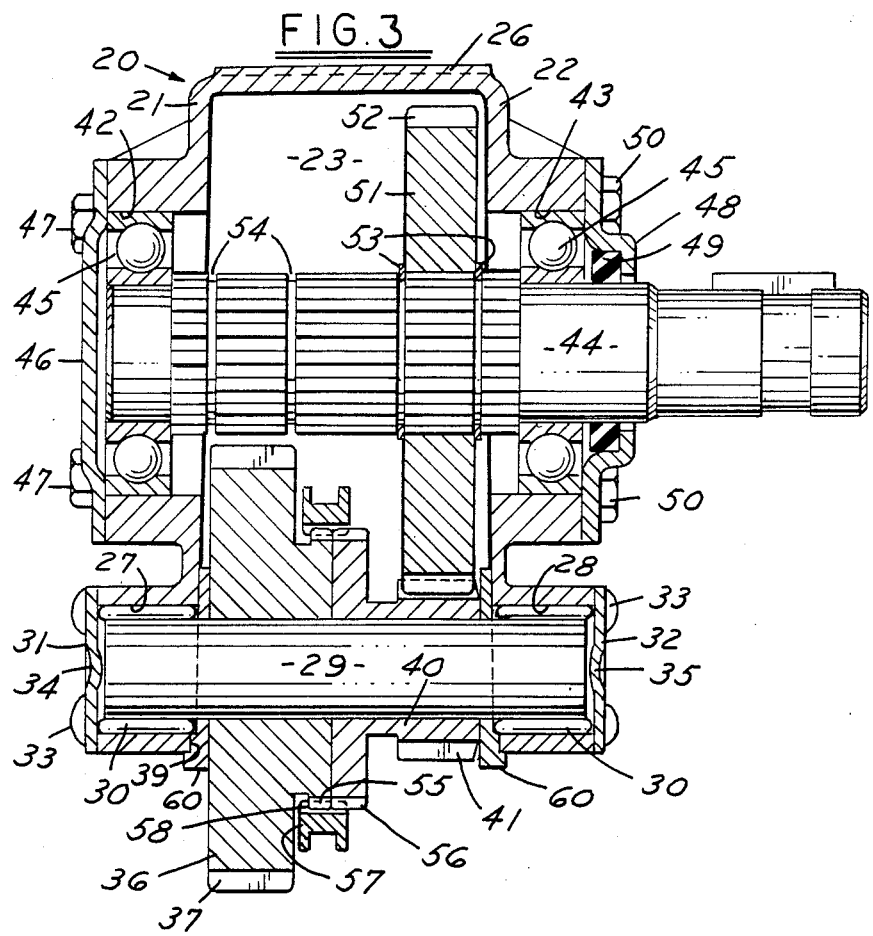
FIG. 3 is a sectional view taken along the line III—III in FIG. 1.

Referring to FIGS. 1 and 3, the power take-off device comprises a housing 20 that is die cast and includes spaced side walls 21, 22 an end wall 23 and a front end wall 24 having an opening closed by a shifter mechanism 25, as presently described. The housing further includes a top wall 26. The bottom of the housing is open, as presently described.

The walls 21, 22 include a first set of aligned openings 27, 28 in walls 21, 22 in which a cylindrical input shaft 29 is rotatably mounted by needle bearings 30. Cap covers 31, 32 in the form of metal plates are fixed over the ends of the openings 27, 28 by screws 33 for closing the openings 27, 28. The length of the shaft 29 is slightly less than the distance between the caps 31, 32 so that the shaft 29 has limited axial movement. The caps 31, 32 preferably include axially inwardly extending portions 34, 35 for laterally locating the floating shaft which are preferably hardened as is the shaft 29.

An input gear 36 is rotatably mounted on the shaft 29 and has an annular array of teeth 37 for engagement with a gear of a transmission on which the power take-off device is mounted by bolts extending through a flange 38. The gear 36 extends through the open end 39 of the housing. A second gear 40 is also rotatably mounted on shaft 29 and has an annular array of teeth 41. The housing 20 further has a second set of aligned openings 42, 43 in walls 21, 22 in which an output shaft 44 is rotatably mounted by ball bearings 45. Opening 42 is closed by a cover 46 held in position by bolts 47 and the other opening 43 has a retainer plate 48 supporting a seal 49, the retainer plate 48 being held in position by bolts 50. A gear 51 having an annular array of teeth 52 is splined to the shaft 44 and held in position by snap rings 53 for engagement with the teeth 41 of gear 40. Shaft 44 includes additional grooves 54 for positioning the gear 51 in any desired position as when it is desired to change the shaft 44 so that it extends to the left rather than to the right out of the power take-off, as viewed in FIG. 3. Various arrangements can be provided as shown in FIGS. 5A, B, C and D. In FIGS. 5A and B, the input gear is placed to the right or left as viewed. In FIGS. 5C and D, the output shaft 44 extends outwardly in an opposite direction from that of FIGS. 5A and 5B and the input gear is in two positions, respectively.

In order to engage and disengage the power from the transmission, a clutch and shifter mechanism is provided. (FIG. 3). Gears 36, 40 are provided with a gear portion 55, 56 respectively, which has annular sets of teeth of the same diameter and a clutch member 57 with internal teeth 58 is shiftable from a position where it engages only the teeth of one gear portion to a position where it engages the teeth of both gear portions 55, 56 by a shifter mechanism as presently described. When the clutch 57 is engages power is transmitted from the gear 36 through gear 40 to gear 51 and, in turn, the output shaft 44.

When the power take-off is disengaged, the input gear 36 rotates freely on the shaft 29. The tolerances between the outer diameter of shaft 29 and the inner diameter of gear 66 are such that a thin layer or film of oil from the oil in the housing 20 provided sufficient lubrication to prevent wear between the metal to metal surfaces. When the power take-off is engaged, the input gear 36 and gear 40 are rotated and the load causes the shaft 29 to rotate in bearings 30.

In order to obviate the need for any machining of the inner surfaces of walls 21, 22 of the die cast housing with respect to the shaft 29, tapered washers 60 are provided between the surfaces of the walls 21, 22 and the respective gears 36, 40. Each washer has a surface 62 (FIG. 7) that has the same transverse angle as the taper of the wall surface, namely about 1°, and an inner surface 61 that is at an angle so that the inner surface 61 is perpendicular to the axis of the shaft 29 and respective gears 36, 40 (FIG. 3). Tapered washers can also be used in power take-off devices incorporating shafts which are similarly mounted to obviate the need for machining.

Figure 6:
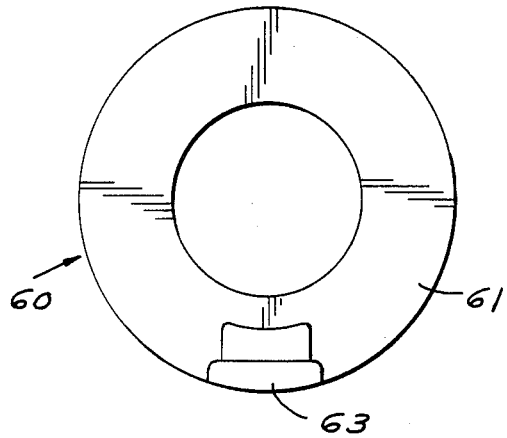
FIG. 6 is a plan view of a thrust washer used in the device.
Figure 7:
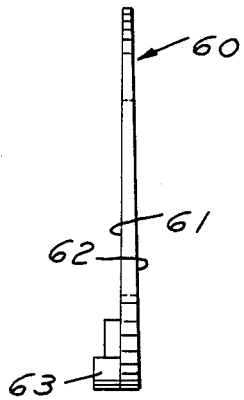
FIG. 7 is a side elevational view of the thrust washer.

Referring to FIGS. 3, 6 and 7, each washer 60 is preferably provided with an integral tang 63 for engaging a recess on the inner surface of the wall for preventing rotating and maintaining the proper position of the washer 60 circumferentially of the shaft 29 (FIG. 3). As shown in FIGS. 6 and 7, the washer 60 is preferably made of powdered metal such as PMIF Standard CT-0010-S and includes the integrally formed tang 63 that extends circumferentially. In the modified form of washer as shown in FIGS. 18, 19, the washer 60a is made of sheet metal and includes a tang 63a that is cut and bent out of the general plane of the washer 60a for engagement with the recess 39 in the respective wall 21, 22 of the housing 20 (FIG. 3).

Referring to FIGS. 8–10, the mechanism for shifting the clutch comprises a removable sub-assembly that includes a die cast housing 60 that is bolted over an opening in the housing 20. A yoke member 67 that extends partially about the clutch 57 and within an annular peripheral groove 68 in clutch 57 and is shiftable axially of the shaft 29 for shifting the clutch 57. Cover housing 66 includes aligned openings 69, 70 in which identical cup members 71 are provided. Each cup member 71 includes a cylindrical portion 72 and an end wall 73 with an axial opening 74 therein. The end wall 74 includes a flange 75 that engages the side walls of housing 66. The yoke member 67 is mounted on a piston by a screw 76a which is telescoped within one of the cup members 71. The piston 76 has an O-ring 77 in a groove 78 thereof sealingly engaging the internal surface of the cylindrical portion 70a. Air or other fluid is applied through an opening 74 in the end wall 73 of cup member 71 in which piston 76 is positioned. The other cup member 71 supports a compression spring 79 which yieldingly engages the yoke member 67 and urges the yoke piston 76 to the right as viewed in FIG. 10. A plug 80 is threaded into opening 74 of the other cup member. The cup members 71 are preferably made of powdered metal and are identical in construction so that they can be used interchangeably. By this arrangement it is possible to reverse the gearing so that the gear 36 is on the right and the gear 40 on the left and, in turn, reverse the position of the piston 76 so it extends into the cup member 71 on the left rather than on the right to obtain a greater flexibility.

As shown in FIG. 10, the housing includes integral stops 81 engaging the yoke 67 for limiting the movement of the yoke. A switch 82 is provided in the cover housing and is engaged by yoke member 57 to provide an electrical signal indicating that the clutch is engaged (FIG. 8).

Referring to FIGS. 11–17, a modified form of power take-off device 25a is shown wherein the shifting mechanism comprises a mechanical arrangement that can be connected by a cable or other linkage to the operator's cab of the vehicle.

The shift mechanism comprises a die cast housing 85 (FIG. 13, 14) that is removably mounted on the housing of the power take-off device by bolts. The housing 85 includes side walls 86, 87 having aligned openings 88, 89, opening 88 having a greater diameter than opening 89. A shaft 90 which is generally cylindrical is positioned in opening 88 and has a portion of reduced diameter extending through the opening 89 of smaller diameter and a screw 91 is threaded into the end of the shaft 90 clamping the shaft in position. The shaft 90 includes an O-ring 92 in a peripheral groove of the cylindrical portion defining a seal with the opening 88 and a washer 93 interposed between the end of the larger cylindrical portion and the other wall 87, the washer 93 including a resilient integral seal therewith. Such a washer is well known in the art. Such a construction and use of the die cast cover eliminates the need to machine the cover for the shaft.

As shown in FIGS. 13 and 14, the yoke 94 includes an enlarged portion 95 slidable on the cylindrical portion of the shaft 90 providing lateral stability to the yoke. The yoke 94 is engaged by a yoke plate 96 with the yoke 94 extending into a notch 96a in the yoke plate 96. The plate 96 is pivotally mounted within the housing 85 by a trigger 97 that includes a shaft portion 98 extending through an opening in the housing 85 of the housing so that an operating arm 99 can be engaged with teeth on the periphery thereof. A bolt 100 holds the arm 99 against the housing 85 with interposed washers and an O-ring inserted in the die cast O-ring recess. The trigger 97 further includes a laterally extending trigger plate 101 (FIG. 7) that includes a circumferentially extending cam 102 having ramps 103 that function to move a spring loaded detent 104 axially (FIGS. 12, 17). The cam 102 extends into a slot 105 in plate 96 that has enlarged ends or holes 106 into which the spring loaded detent 104 is adapted to engage. When the arm 99 is moved, the trigger plate 101 is rotated rotating the yoke plate 96 so that the detent 104 moves up one of the ramps 102 and cams the detent 104 upwardly thus unlocking the yoke plate 96 out of one of the holes 106, across the narrow portion of the slot 105 and then back down into the other hole 105, thus locking the yoke plate 96 in a new position. In this manner the yoke 94 is shifted from one position to another. Rotary motion of the cam is thus converted to linear motion of the yoke 94 in moving from one position to the other. Thus, accidental engagement or disengagement of the power take-off is prevented. The yoke 94, trigger 97, and yoke plate 96 are necessarily made of powdered metal. A tang 107 on plate 96 operates a single switch as in the other form of shift mechanism. This shift mechanism referred to in FIGS. 11-17 is interchangeable with the shift mechanism referred to in FIGS. 8-10.

I claim:

1. A power take-off device comprising
a housing having spaced walls,
an input shaft,
said walls of said housing having a first set of aligned openings,
means rotatably mounting said input shaft in said aligned openings,
an output shaft,
said walls of said housing having a second set of aligned openings in said walls,
means for rotatably mounting said output shaft in said second set of openings,
first and second gears interposed between said walls and rotatably mounted on said input shaft,
said first gear having an annular array of teeth,
said housing having an opening through which said annular array passes for engagement with a power source,
said second gear having an annular array of teeth,
a third gear fixed on said output shaft and having an annular array of teeth meshing with the teeth on the second gear,
said first and second gears having annular gear portions with aligned teeth,
an annular clutch member having internal teeth movable from a position wherein said internal teeth engage a gear portion of one of said first and second gears to a position wherein said internal teeth engage the second gear portions of the first and second teeth.

2. The power take-off device set forth in claim 1 wherein said input shaft is cylindrical, said first and second gears having openings through which said input shaft extends.

3. The output shaft device set forth in claim 2 wherein said housing has covers on said first sets of openings, said input shaft having a length slightly less than the distance between said covers such that the input shaft has limited axial movement.

4. The power take-off device set forth in claim 3 wherein each said cover has a central axially inwardly extending portion for engagement with the ends of said shaft.

5. The power take-off device set forth in claim 4 wherein said axial extending portions are hardened.

6. The power take-off device set forth in claim 1 wherein the opening in said housing is sufficiently large to permit removal of the first and second gears by first removing the input shaft axially so that the first and second gears are thereby released.

7. The power take-off device set forth in claim 1 wherein said walls of said housing have tapered surfaces extending inwardly toward one another,
a washer interposed between the first gear and one of said walls,
a second washer interposed between the second gear and the other of said walls,
said washers having openings through which the input shaft extends,
each said washer having spaced wall surfaces which taper such that the washers provide parallel surfaces for engagement with the first and second gears, respectively.

8. The power take-off device set forth in claim 7 wherein each said washer has a tang, said housing having a recess into which said tang extends.

9. The power take-off device set forth in claim 8 wherein said washer is made of powdered metal.

10. The power take-off device set forth in claim 7 wherein said housing is die cast.

11. The power take-off device set forth in claim 1 wherein said clutch member includes an annular groove,
a yoke engaging said groove and shifter means for moving said yoke axially relative to said first and second gears for engaging and disengaging said first and second gears with one another.

12. The power take-off device set forth in claim 11 wherein said shifter means comprises a cover housing, said cover housing closing a second opening in the housing, said cover housing having aligned spaced openings therein, a cup member including an end wall and a cylindrical wall positioned in each said opening with the cylindrical wall extending axially inwardly of the cover housing, a piston extending into the cylindrical wall of one of said cup members, means connecting the yoke to said piston, spring means interposed between the end wall of the other cup member and the yoke for urging said piston toward one end of said first cup member, each said end wall of each said cup including an opening, means for closing one of said openings such that the other of the openings in the cup member in which the piston is positioned can be used for applying fluid to move the piston and in turn the yoke and shift the clutch.

13. The power take-off device set forth in claim 12 wherein said end wall includes a peripheral flange engaging the exterior of the cover housing.

14. The power take-off device set forth in claim 13 wherein said cover housing includes a radial opening, and switch means positioned in said opening for engagement with the yoke to provide a signal representing the relative postion of the yoke.

15. The power take-off device set forth in claim 12 wherein said cover housing is die cast.

16. A power take-off device comprising
a housing having spaced walls,
an input shaft,
said walls of said housing having a first set of aligned openings,
bearing means rotatably mounting said input shaft in said aligned openings,
an output shaft,
said walls of said housing having a second set of aligned openings in said walls,
means for rotatably mounting said output shaft in said second set of openings,
first and second gears interposed between said walls and rotatably mounted directly on said input shaft,
said first gear having an annular array of teeth,
said housing having an opening through which said annular array passes for engagement with a power source,
said second gear having an annular array of teeth,
a third gear fixed on said output shaft and having an annular array of teeth meshing with the teeth on the second gear,
said first and second gears having annular gear portions with aligned teeth.

17. The power take-off device set forth in claim 16 wherein said input shaft is cylindrical, said first and second gears having openings through which said input shaft extends.

18. The output shaft device set forth in claim 17 wherein said housing has covers on said first sets of openings, said input shaft having a length slightly less than the distance between said covers such that the input shaft has limited axial movement.

19. The power take-off device set forth in claim 18 wherein each said cover has a central axially inwardly extending portion for engagement with the ends of said shaft.

20. The power take-off device set forth in claim 19 wherein said axial extending portions are hardened.

21. The power take-off device set forth in claim 16 wherein the opening in said housing is sufficiently large to permit removal of the first and second gears by first removing the input shaft axially so that the first and second gears are thereby released.

22. A power take-off device comprising
a die cast housing,
a plurality of shafts rotatably mounted in parallel spaced relation in openings in said housing,
gears on said shafts adapted to intermesh,
said walls of said housing have tapered surfaces extending inwardly toward one another,
a washer interposed between the first gear and one of said walls,
a second washer interposed between the second gear and the other of said walls,
said washers having openings through which the input shaft extends,
each said washer having spaced wall surfaces which taper such that the washers provide parallel surfaces for engagement with the first and second gears, respectively.

23. The power take-off device set forth in claim 22 wherein each said washer has a tang, said housing having a recess into which said tang extends.

24. The power take-off device set forth in claim 23 wherein said washer is made of powdered metal.

25. The power take-off device set forth in claim 22 wherein said housing is die cast.

26. A shifter mechanism for a power take-off device comprising
a cover housing,
said cover housing having aligned spaced openings therein,
a cup member including an end wall and a cylindrical wall positioned in each said opening with the cylindrical wall extending axially inwardly of the cover housing,
a piston extending into the cylindrical wall of one of said cup members,
a yoke for engaging and shifting gears,
means connecting the yoke to said piston,
spring means interposed between the end wall of the other cup member and the yoke for urging said piston toward one end of said first cup member,
each said end wall of each said cup including an opening, means for closing one of said openings such that the other of the openings in the cup member in which the piston is positioned can be used for applying fluid to move the piston and in turn the yoke and shift the clutch.

27. The shifter mechanism set forth in claim 26 wherein said end wall of each cup member includes a peripheral flange engaging the exterior of the cover housing.

28. The shifter mechanism set forth in claim 27 wherein said housing includes a radial opening, and switch means positioned in said opening for engagement with the yoke to provide a signal representing the relative position of the yoke.

29. The shifter mechanism set forth in claim 26 wherein said housing is die cast.

30. A shifter mechanism for power take-off device comprising
a housing member,
an annular clutch member having internal teeth movable from position wherein said internal teeth engage a gear portion of one of first and second gears to a position wherein said internal teeth engage second gear portions of the first and second gears, said clutch member including an annular groove, a yoke engaging said groove partially about the clutch member and shifter means for moving said yoke axially relative to said first and second gears for engaging and disengaging said first and second gears with one another, wherein said housing member has aligned spaced openings therein, a cup member including an end wall and a cylindrical wall positioned in each said opening with the cylindrical wall extending axially inwardly of the housing member, a piston extending into the cylindrical wall of one of said cup members, means connecting the yoke to said piston, spring means interposed between the end wall of the other cup member and the yoke for urging said piston toward one end of said first cup member, each said end wall of each said cup including an opening, means for closing one of said openings such that the other of the openings in the cup member in which the piston is positioned can be used for applying fluid to move the piston and in turn the yoke and shift the clutch.

31. The shifter mechanism set forth in claim 30 wherein said end wall of each cup member includes a peripheral flange engaging the exterior of the cover housing.

32. The shifter mechanism set forth in claim 31 wherein said housing includes a radial opening, and switch means positioned in said opening for engagement with the yoke to provide a signal representing the relative position of the yoke with respect to said housing.

33. The shifter mechanism set forth in claim 30 wherein said housing is die cast.

34. A power take-off device comprising a housing having spaced walls, an input shaft, said walls of said housing having a first set of aligned openings, means rotatably mounting said input shaft in said aligned openings, an output shaft, said walls of said housing having a second set of aligned openings in said walls, means for rotatably mounting said output shaft in said second set of openings, first and second gears interposed between said walls and rotatably mounted in said input shaft, said first gear having an annular array of teeth, said housing having an opening through which said annular array passes for engagement with a power source, said second gear having an annular array of teeth, a third gear fixed on said output shaft and having an annular array of teeth meshing with the teeth on the second gear, said first and second gears having annular gear portions with aligned teeth, an annular clutch member having internal teeth movable from a position wherein said internal teeth engage a gear portion of one of said first and second gears to a position wherein said internal teeth engage the second gear portions of the first and second teeth, said clutch member being shiftable equal distances from the center line of the housing permitting interchangeability of the gears.

* * * * *